United States Patent [19]
Pelham, Sr.

[11] 3,974,124
[45] Aug. 10, 1976

[54] ENERGY ABSORBING VEHICLE BODY MATERIAL

[75] Inventor: Owen H. Pelham, Sr., Detroit, Mich.

[73] Assignee: Woodall Industries Inc., Detroit, Mich.

[22] Filed: June 6, 1973

[21] Appl. No.: 367,636

[52] U.S. Cl. .................. 260/40 R; 260/857 PE; 260/860; 260/862; 280/727
[51] Int. Cl.² ................... C08K 7/02; C08K 7/14
[58] Field of Search ........... 260/40, 860, 40 R, 862, 260/857; 161/176; 280/150 B

[56] References Cited
UNITED STATES PATENTS

| | | | |
|---|---|---|---|
| 2,743,309 | 4/1956 | Lindsay et al. | 260/857 PE |
| 3,044,913 | 7/1962 | Lundberg | 260/862 |
| 3,227,665 | 1/1966 | Fourcode et al. | 260/40 R X |
| 3,562,201 | 2/1971 | Crowe et al. | 260/40 R |
| 3,598,693 | 8/1971 | Andersen et al. | 161/176 X |
| 3,642,560 | 2/1972 | Marsh et al. | 280/150 B |
| 3,701,748 | 10/1972 | Kroekel | 260/40 R |
| 3,721,642 | 3/1973 | Schalin et al. | 260/40 R |
| 3,766,129 | 10/1973 | Pesey | 260/40 R |
| 3,778,334 | 12/1973 | Sturgeon | 161/176 X |

OTHER PUBLICATIONS

E. N. Doyle, *Development and Use of Polyester Products*, 1969, p. 323.

*Primary Examiner*—Lewis T. Jacobs
*Assistant Examiner*—S. M. Person
*Attorney, Agent, or Firm*—Harness, Dickey & Pierce

[57] ABSTRACT

A molding material incorporating certain synthetic fibers in a polyester resin premix or sheet molding compound which will mold up with low shrink and form a panel having enhanced energy absorbing properties. The fibers have high tenacity and high denier, required elongation properties, and are resistant to degradation in the mix. They are used either alone or in combination with glass fibers. Examples of suitable fibers are nylon, polyester or polyvinyl alcohol fibers.

5 Claims, 7 Drawing Figures

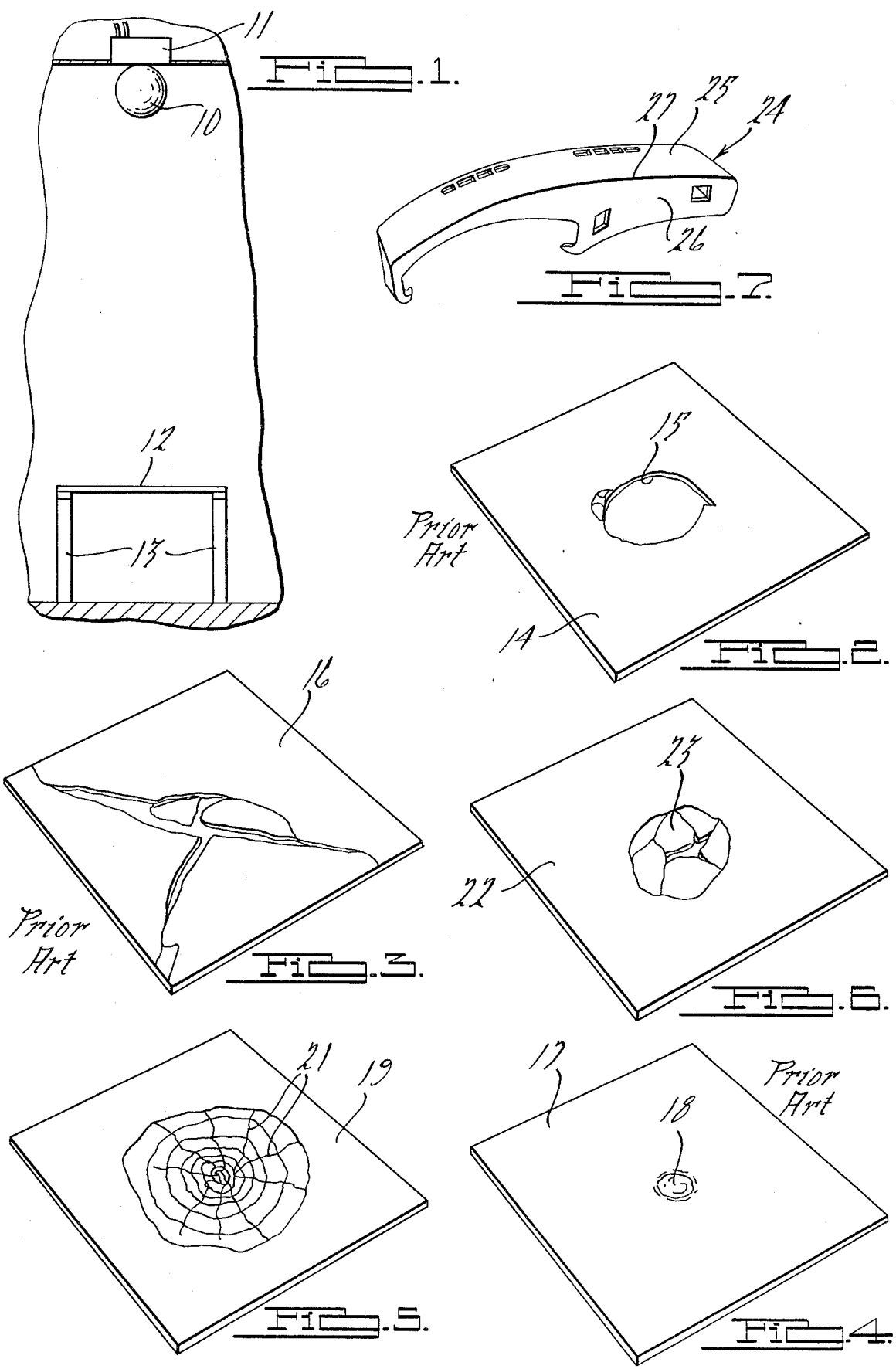

ENERGY ABSORBING VEHICLE BODY MATERIAL

BACKGROUND OF THE INVENTION

1. Field of the Invention

The invention relates to compositions used in the manufacture of vehicle body panels, and particularly to panels which require a high degree of energy absorption. An example of such a panel is the dashboard or instrument panel of an automotive vehicle which is required to perform an energy absorbing function when struck during an accident. Complete shattering of such a panel with slight energy absorption and no rebound could be dangerous. On the other hand, extreme rebound characteristics with very little energy absorption could also be extremely harmful, if for example, is is struck by a human head.

2. Description of the Prior Art

A search revealed the follwoing patents relating to structural plastic materials designed to exhibit specific properties when impacted, but which utilize fiber glass and do not incorporate the materials of the present invention:

| | | |
|---|---|---|
| Davies et al | 2,873,226 | February 10, 1959 |
| Walker et al | 2,881,110 | April 7, 1959 |
| Walker | 2,938,737 | May 31, 1960 |
| Johnston | 3,113,788 | December 10, 1963 |
| Goerden et al | 3,536,549 | October 27, 1970 |
| Andersen | 3,573,144 | March 30, 1971 |
| March, Jr. et al | 3,642,560 | February 15, 1972 |
| Woodham et al | 3,655,850 | April 11, 1972 |

A conventional automotive grade premix, whether made with general purpose polyester resins or low shrink resins and reinforced with sisal or sisal in combination with small amounts of glass fibers, has low impact strength and little energy absorption in the usual thicknesses in which heater housings, consoles, door panel foundations and conceivably instrument panel foundations would be made.

As an example and for purposes of illustration if an edge supported flat panel size 1/10 × 12 × 12 inches made from a sisal reinforced premix is impacted with a 4 lb. ball falling freely 6 ft., the panel will shatter into two or more pieces with the ball instantaneously passing through the panel with very slight energy absorption and obviously no rebound. The behavior is very analogous to what would happen if a piece of ordinary window glass were so impacted. Such a sisal reinforced compound is typified by formulation A. Izod properties are also stated.

| FORMULATION A | |
|---|---|
| A low shrink sisal reinforced Premix compound | |
| COMPONENT | % Wt. |
| Paraplex P-340 Resin (Rohm & Haas Co.) | 12.00 |
| Paraplex P-701 Thermoplastic Additive | 6.54 |
| Benzoyl Peroxide (55% Paste) | .16 |
| Tert-butyl Perbenzoate | .08 |
| Inhibitor | .06 |
| Calcium Carbonate (Camel-carb) | 65.48 |
| Clay (ASP-200) | 6.45 |
| Calcium Stearate | 1.81 |
| Sisal, chopped ⅜" long | 7.42 |
| | 100.00 |
| Izod Impact Strength: 1.20 Ft. Lbs./inch of Notch | |

At the other extreme, for example, is a sheet molding compound (SMC) made with a low shrink polyester resin and a considerable amount of long glass fibers as reinforcement. Such material is commonly used to mold truck fenders, fender extensions, front end pieces, etc. for automobiles.

If an edge supported 1/10 × 12 × 12 panel of this material is impacted in the same manner, i.e., 4 lb. ball 6 ft., the panel will not shatter; in fact, only a small area the size of a quarter on the reverse side of the panel receiving the blow will show some fiber disruption. However, and importantly, the ball will obviously not penetrate through the panel but will rebound a considerable distance, indicating very little energy absorption, i.e., very little deceleration of the ball, but rather an instantaneous reversal in direction. With a human head a high G-force would no doubt result with probable skull fracture or concussion. The behavior is very analogous to what would happen with a steel panel.

Such a SMC compound is typified by formulation B with Izod properties also shown.

| FORMULATION B | |
|---|---|
| A low shrink, high strength, SMC compound | |
| COMPONENT | % Wt. |
| Paraplex P-340 | 16.20 |
| Paraplex P-701 | 10.80 |
| Tert-butyl Perbenzoate | .30 |
| Calcium Carbonate | 40.50 |
| Mg (OH) Thickener | .70 |
| Zinc Stearate | 1.50 |
| 2" Chopped Fiber glass | 30.00 |
| | 100.00 |
| Izod Impact Strength: 15.0 Ft. Lbs. /inch of Notch | |

Polyester premix molding compounds are well established in the trade and are used to mold many different articles. Such compounds are most usually composed of an unsaturated polyester resin in a reactive monomer, suitable inhibitors for maintaining practical shelf life prior to molding, free radical generating catalysts to initiate resin reaction during molding, a suitable filler system, a lubricant to provide release from the mold, a colorant and reinforcing fibers. The preparation of these resins, types of raw materials and methods of preparing premix compounds have been well described in technical literature, including patents such as U.S. Pat. Nos. 2,255,313; 2,632,751; 3,227,665 and 3,701,748. The latter describes a suitable type of low shrinkage resin system for the present invention. U.S. Pat. No. 3,227,665, while directed to other subject matter, mentions various types of inorganic and organic reinforcing fibers in a polymerizable, cross-linkable unsaturated polyester resin composition.

BRIEF SUMMARY OF THE INVENTION

It is an object of the present invention to provide a novel and improved material capable of being formed into an automotive vehicle panel which will have high energy absorption characteristics.

It is another object to provide a molding material which will mold up with low shrink and have energy abosrbing properties.

Briefly, the invention comprises a low shrink premix or sheet molding compound (SMC) containing as reinforcement high tenacity, high denier synthetic fibers such as nylon (polyamide) or Fortrell (polyester —Celanese Corp.) either alone or in combination with glass fibers and which has the desirable properties of precision molding, dimensional stability and impact energy absorption.

BRIEF DESCRIPTION OF THE DRAWINGS

FIG. 1 is an elevational view showing a test setup for panels;

FIG. 2 is a perspective view of a test sample utilizing Formulation A of the prior art after it has been tested in the apparatus of FIG. 1;

FIG. 3 is a perspective view of a test sample made from another sisal reinforced premix compound;

FIG. 4 is a perspective view of a panel fabricated according to Formulation B of the prior art after it has been tested;

FIG. 5 is a perspective view of a test sample using a formulation made according to the invention, after testing;

FIG. 6 is a perspective view of another panel fabricated according to a formulation of this invention after it has been tested; and FIG. 7 is a perspective view of an instrument panel fabricated according to the invention.

DESCRIPTION OF THE PREFERRED EMBODIMENT

A suitable type of low shrinkage resin system for use with the present invention is described in the above-mentioned U.S. Pat. No. 3,701,748. This is an unsaturated polyester resinous composition. The premix may be prepared by a conventional process. In brief, the batch process of preparing premix consists of charging the raw materials into a sigma or spiral blade intensive mixer and mixing unitl uniform. Most usually the various powdery particulate fillers, colorants and lubricant are added and dry blended, then the catalyzed liquid resin and monomer is added and mixed until uniform and finally the chopped staple reinforcing fibers are added and mixed.

The appearance of these premix compounds suggests a putty or dough which contains fibers. The consistency may vary from a firm mass to a soft mass depending upon molding requirements. Such mixes can be molded in bulk form or extruded into a billet or log of convenient size for more convenient handling at the molding press. The material is adaptable to being flowed or moved by pressure and when placed in a hot mold can be caused to fill the mold and cured by heat into a thermoset mass.

According to the present invention, only reinforcing synthetic fibers having certain properties can be used, alone or with glass fibers. As described above, neither sisal fibers nor glass fibers alone will work. This is demonstrated by the test results using apparatus as shown in FIG. 1. The test apparatus comprised a 4 lb. ball 10 hald 6 ft. above a test panel by electromagnetic means 11. The test panel, indicated at 12 in FIG. 1, was 1/10 inches thick and 12 × 12 having edge supports 13. In the case of the sisal reinforced premix (Formulation A), the test results were indicated in FIG. 2. In this Figure, the panel is indicated at 14 and the aperture caused by the ball 10 is indicated at 15.

Another example of a test sample made with a low shrink sisal reinforced premix compound is that indicated at 16 in FIG. 3. This compound had the following formulation:

| COMPONENT | % Wt. |
|---|---|
| Polyester Resin GR-373 (W. R. Grace-Marco Chemical Division) | 32.44 |
| Styrene Monomer | 1.14 |
| Benzoyl Peroxide Paste | .44 |
| Inhibitor | .05 |
| Calcium Stearate | 1.62 |
| Iron Oxide (black coloring) | .51 |
| Calcium Carbonate | 40.84 |
| 7 T-5 Asbestos Fibers | 15.09 |
| Sisal ⅜" Staple Fibers | 7.87 |
| | 100.00 |

It will be noted that, as in the case of FIG. 2, the panel shattered into several pieces. The ball instantaneously penetrated the panel with very slight energy absorption.

FIG. 4 shows a panel indicated at 17 made with a low shrink polyester resin and a considerable amount of long glass fibers as reinforcement (Formulation B). Only the small area 18 received fiber disruption and the panel did not shatter. The ball rebounded a considerable distance, showing very little energy absorption.

FIG. 5 shows a panel fabricated with a molding material made according to the present invention, that is, a material which will mold up with low shrink and have energy absorbing properties. By impacting the panel indicated at 19 in the same manner as previously, one observes that:

1. The ball does not penetrate entirely through the panel as with panel 14.
2. The panel does not shatter and fly into two or more separate pieces as with panel 16.
3. The ball does not rebound nearly as high as with paneel 17, indicating energy absorption.

The panel did rupture and numerous cracks indicated at 21 were evident in the area of contact, but all the pieces held together by bridging synthetic fibers, in a manner similar to that of safety glass.

The panel 19 was fabricated by the following formulation:

FORMULATION C
A low shrink, synthetic fiber reinforced Premix

| COMPONENT | % Wt. |
|---|---|
| Paraplex P-340 | 15.76 |
| Paraplex P-701 | 6.76 |
| Benzoyl Peroxide Paste 55% | .22 |
| Tert-butyl Perbenzoate | .11 |
| Inhibitor | .05 |
| Calcium Carbonate (Camel-carb) | 60.05 |
| Clay (ASP-200) | 6.33 |
| Calcium Stearate | 2.14 |
| ¼" Chopped Polyester fiber of Nylon (6 denier per filament with tenacity of 8 grams per denier) | 8.58 |
| | 100.00 |

Izod Impact Strength: 4.5 Ft. Lbs./inch of Notch

FIG. 6 shows another test panel indicated at 22 with the fracture being indicated at 23. This panel was made of the following formulation:

| COMPONENT | % Wt. |
|---|---|
| Paraplex P-340 Resin | 15.54 |
| Paraplex P-701 | 6.66 |
| Benzoyl Peroxide Paste | .21 |
| Tert-Butyl Perbenzoate | .10 |
| Inhibitor | .06 |
| Calcium Carbonate | 59.22 |
| Clay | 6.34 |
| Calcium Stearate | 2.11 |
| ¼" Polyester Fibers | 4.88 |

-continued

| COMPONENT | % Wt. |
|---|---|
| (6 denier per filament with tenacity of 8 grams per denier) ¼" Chopped Glass Fiber | 4.88 |
| | 100.00 |

It will be noted that this panel fractured only partially into several pieces which adhered to each other and that the ball did not penetrate the panel. There was substantial energy absorption. This combination of polyester fibers and glass fibers, while not exhibiting quite the energy absorption as the sample made only with polyester fibers, seemed to exhibit greater flexural strength and handling characteristics. This makes it highly suitable for the shipping and handling which panels must undergo when being assembled with other parts and materials in an automobile.

While other premixes may be used, it is desirable that the matrix be relatively brittle so that it will tend to shatter to an extent which will impose tensile loads on the fibers. (By "matrix" is meant the resin and aforementionend ingredients such as catalyst, lubricant, fillers and colorant.) In other words, the matrix surrounding the fibers, being relatively rigid and with low elongation, fails and this leaves the fibers bridging the initiated lines of fracture.

With this factor in mind, the fibers used must be such as to have relatively high strength and adhesion characteristics so that they will not pull apart in tension or separate from the matrix. Synthetic fibers with high strength and high elongation tend to monentarily bridge the crack gaps and the load is transferred to the fibers which elongate with resistance until they rupture or pull out from the matrix, consuming time and energy. It should be pointed out that this is merely a conjectural explanation of the mechanism which results in energy absorption.

In selecting the kinds of fibers which will carry out the objects of this invention, one must choose fibers which will maintain their fiber identity and character during the preparation of the premix and the molding operation, i.e., the fibers must resist the effect of styrene or other monomer and be resistant to temperatures up to 350°F.

Fibers generally ruled out on these considerations or through actual trial are modacrylic, polyethylene, polypropylene, Saran (Dow Chemical Co.), nytrile and vinyon.

Since sisal and glass have low elongations (3–4%) one can rule them out together with low elongation natural fibers like cotton, hemp, etc. and inorganic fibers like asbestos.

In the preferred embodiment of the idea we use high-denier; high tenacity, nylon or polyester fibers or polyvinyl alcohol fibers. We use chopped fibers cut ¼ inch in length although longer fibers can be used. Fiber handling characteristics prior to and including making the mix seem to be the controlling factors. Lengths from ⅛ inch to ½ inch are suitable. The effect of fiber length upon impact test results has not been very significant. Straight fibers and crimped fibers have produced similar test values. The effect seems to be one of zero span tension test. Fiber diameter, fiber amount and tensile strength do seem to be important.

Small diameter 1–4 denier per filament and low tenacity up to 5 g per denier are not adequate for this application. If we again consider the tensile situation just after the fracture of the matrix we will see that the greater the cross-sectional area which is fiber and the greater the strength of the individual fibers the more effort it will take to pull the fibers apart.

High tenacity nylon has tensile strength of 60–130,000 PSI, high tenacity polyester 100,000 to 140,000 PSI. These fibers offer resistance to being pulled apart and coupled with the higher elongation dissipate the force over a period of time.

Therefore and as presently understood we prefer fibers with the following general characteristics:

Fiber type — Polymers which resist heat and monomeric crosslinkers used in polyester resins. Resistant to 350°F, and resistant to styrene, vinyl toluene diallyl phthalate monomers.

Fiber diameter — 5 denier or more.

Fiber tenacity — 5 g per denier to 9 g per denier or higher.

Fiber elongation — 8 to 40%

Percent by weight in formulation — 3 to 20% for premix bulk molding compounds when synthetic fibers only are used. When used in combination with glass fibers to upgrade the flexural strength, then a range of 3% synthetic fiber and 5% glass to 10% synthetic fiber and 15% glass is suitable.

FIG. 7 shows a typical part which may be constructed for automotive applications using the material of the present invention. This is an automobile dashboard or foundation panel generally indicated at 24. The panel has an upwardly facing surface 25 and a rearwardly facing surface 26, the juncture of these two surfaces being indicated at 27. Upon impact of the head or other body portion of the passenger with surfaces 25 or 26 or edge 27, entry will be lessened by the energy absorbing properties of the material. In use, the foundation panel 24 is covered with a foam padding and a formed decorative sheet (not shown).

I claim:

1. A composition for use in molding an energy absorbing vehicle body panel, comprising an unsaturated polyester resin matrix unifromly mixed with glass fibers and synthetic thermoplastic fibers chosen from the group consisting of nylon, polyester and polyvinyl alcohol fibers, said resin matrix being relatively brittle as compared with said thermoplastic fibers, said thermoplastic fibers having suffficiently high denier and high tenacity as to provide substantial energy absorption when the panel is impacted, the lengths of said thermoplastic fibers being between ⅛ and ½ inch, the amount of thermoplastic fibers being 3 to 10% and of glass fibers 5 to 15% by weight, said thermoplastic fibers having a fiber diameter of 5 denier or more, a fiber tenacity of 5 grams per denier or more and an elongation of 8 to 40%.

2. A composition according to claim 1, said thermoplastic fibers being polyester.

3. A composition according to claim 1, said thermoplastic fibers being nylon.

4. A composition according to claim 1, said thermoplastic fibers being polyvinyl alcohol.

5. A composition according to claim 1, said unsaturated polyester resin matrix being low shrinkage.

* * * * *

UNITED STATES PATENT OFFICE
CERTIFICATE OF CORRECTION

PATENT NO. : 3,974,124
DATED : August 10, 1976
INVENTOR(S) : Owen H. Pelham, Sr.

It is certified that error appears in the above-identified patent and that said Letters Patent are hereby corrected as shown below:

Column 3, line 35, "unitl" should be --until--; line 57, "hald" should be --held--; line 59, "12 x 12" should be --12" x 12"--; Column 4, lines 24 and 25, "materail" should be --material--; line 35, "paneel" should be --panel--; line 52, "of" should be --or--; Column 5, line 33, "monentarily" should be --momentarily--; line 64, after "of" insert --a--; Column 6, line 45, "unifromly" should be --uniformly--; line 50, "suffficiently" should be --sufficiently--;

Signed and Sealed this

Seventh Day of December 1976

[SEAL]

Attest:

RUTH C. MASON
Attesting Officer

C. MARSHALL DANN
Commissioner of Patents and Trademarks